United States Patent [19]

Finkbeiner et al.

[11] Patent Number: 4,596,098

[45] Date of Patent: Jun. 24, 1986

[54] SNAP-FIT RACEWAY ARRANGEMENT

[75] Inventors: James Finkbeiner, Kentwood; Jeffrey J. Reuschel, Holland, both of Mich.

[73] Assignee: Haworth, Inc., Holland, Mich.

[21] Appl. No.: 732,481

[22] Filed: May 9, 1985

[51] Int. Cl.⁴ .............................................. E04H 1/00
[52] U.S. Cl. ........................................ 52/220; 52/239; 52/241; 339/22 R; 339/24; 339/44 R
[58] Field of Search ...................... 339/22 R, 24, 44 R, 339/23; 52/241, 242, 221, 220, 239

[56] References Cited

U.S. PATENT DOCUMENTS

| | | | |
|---|---|---|---|
| 3,513,606 | 5/1970 | Jones | 52/241 |
| 3,649,951 | 3/1972 | Routh | 339/24 |
| 4,043,626 | 8/1977 | Propst | 339/23 |
| 4,060,294 | 11/1977 | Haworth | 52/239 |
| 4,158,936 | 6/1979 | Fulton | 52/242 |
| 4,277,123 | 7/1981 | Haworth | 339/44 R |
| 4,391,073 | 7/1983 | Mollenkopf | 52/241 |

Primary Examiner—Henry E. Raduazo
Attorney, Agent, or Firm—Flynn, Thiel, Boutell & Tanis

[57] ABSTRACT

A raceway structure for a prewired wall panel, which structure provides a raceway formed by a single upwardly opening channel-shaped member which releasably attaches to the lower edge of the panel frame. Each leg of this channel member forms an openable side cover. At the end of a series of panels, a one-piece end cover snappingly engages the end of the channel member to close off the channel member and to provide a sturdy structure having a highly desirable appearance. When two such panels are joined to define a 90° corner, then similar end covers can again be utilized, which end covers can be cut along predetermined score lines to define either windows or doors which readily accommodate either a flexible electrical connector joining the two panels, or communication cables which extend between adjacent panels.

10 Claims, 14 Drawing Figures

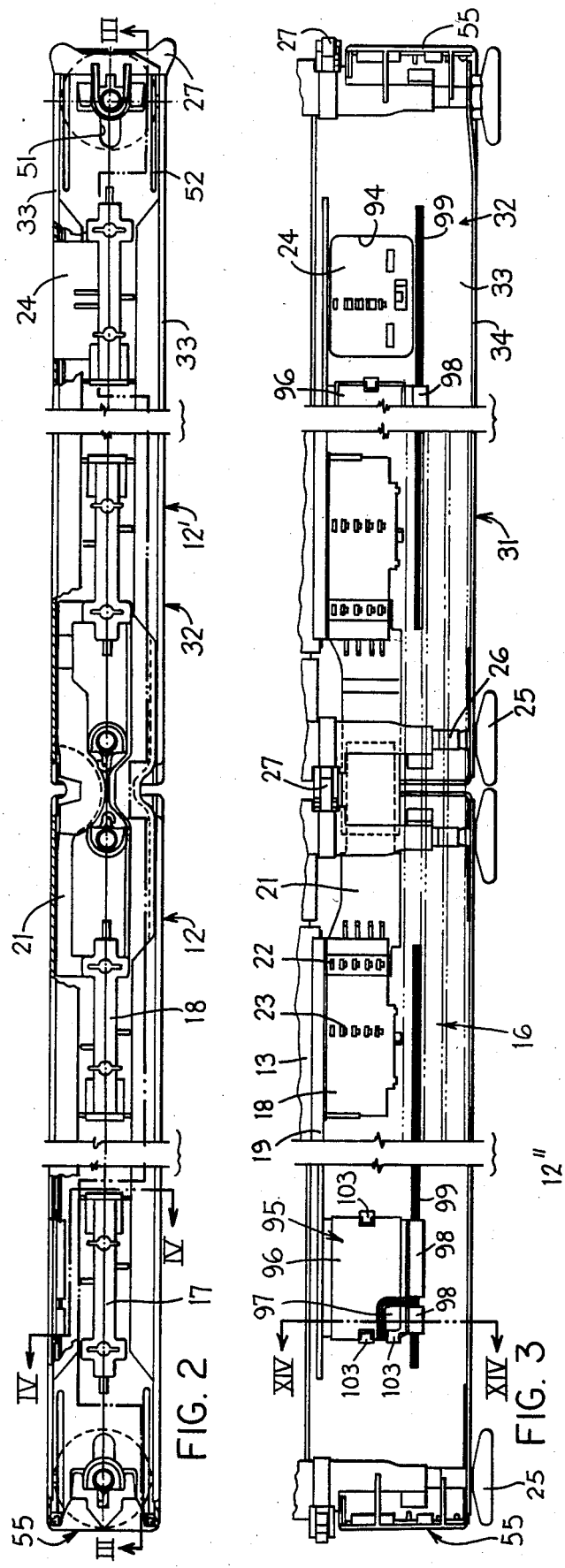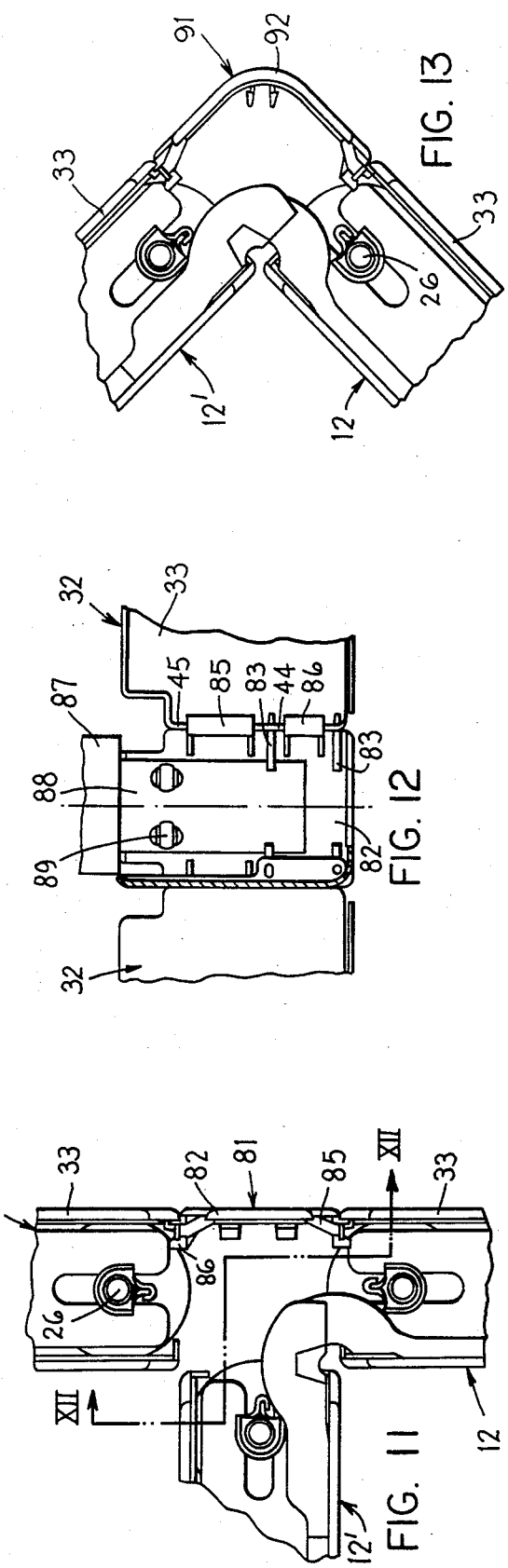

4,596,098

SNAP-FIT RACEWAY ARRANGEMENT

FIELD OF THE INVENTION

This invention relates to an improved power and communication raceway structure as associated with an electrically prewired wall panel.

BACKGROUND OF THE INVENTION

U.S. Pat. No. 4,277,123, as owned by the assignee of this application, discloses therein a raceway structure for a prewired wall panel, which raceway structure has proven highly desirable for use in conjunction with a wall panel system of the type disclosed in U.S. Pat. Nos. 4,060,294 and 4,277,123, also owned by the assignee of this application. The disclosures of these three patents are incorporated herein by reference.

While the raceway structure of the aforementioned '123 patent has been commercially and successfully utilized on prewired wall panels for several years, nevertheless this known structure has possessed some structural and esthetic characteristics which were believed capable of improvement, and the raceway structure of this invention was developed as an improvement thereover.

More specifically, the aforementioned raceway, together with many other known raceways, has involved sonically welded plastic components. Such structures create manufacturing problems, and sometimes experience weld failures. Thus, the raceway structure of this invention is advantageous since the channel-shaped raceway is formed by a single upwardly opening channel-shaped member which releasably attaches to the lower edge of the panel frame, with each leg of this channel member forming an openable side cover by being integrally attached to the bottom wall through an integral plastic hinge. At the end of a series of panels, a one-piece end cover snappingly engages the end of the channel member to close off the channel member and at the same time provide a sturdy structure having a highly desirable appearance. When two such panels are joined to define a 90° corner, then similar end covers can again be utilized, which end covers can be appropriately cut along predetermined score lines so as to define either windows or doors which readily accommodate either a flexible electrical connector joining the two panels, or communication cables which extend between adjacent panels. A similar end cover which extends around a 90° corner can also be provided for joining the channel members of two panels together in those instances where a corner post is provided. The side covers of the channel member also have openable access covers into which removable receptacle units can be positioned, and these access covers are secured to the inner side of the side covers in an improved manner so as to permit the access covers to be readily repositioned for closing the access opening if desired.

The improved raceway structure of this invention permits use of all plastic components, but does not require any components to be welded together.

Other objects and purposes associated with the improved raceway structure of this invention will be apparent to persons familiar with structures of this type upon reading the following specification and inspecting the accompanying drawings.

BRIEF DESCRIPTION OF THE DRAWINGS

FIG. 2 is a fragmentary sectional view as taken through the raceway structure, as viewed from above, and showing the interconnection of the electrical structure associated with the two panels of FIG. 1;

FIG. 3 is a sectional view taken substantially along line III—III in FIG. 2;

FIG. 11 is a top view illustrating the cover used for adjoining the raceway members of two panels associated with a three-panel connection;

FIG. 12 is a view taken substantially along line XII—XII in FIG. 11;

FIG. 13 is a top view which illustrates a further type of cover used for joining the raceway members of two joined panels oriented at 90° with respect to one another.

Figure 1:
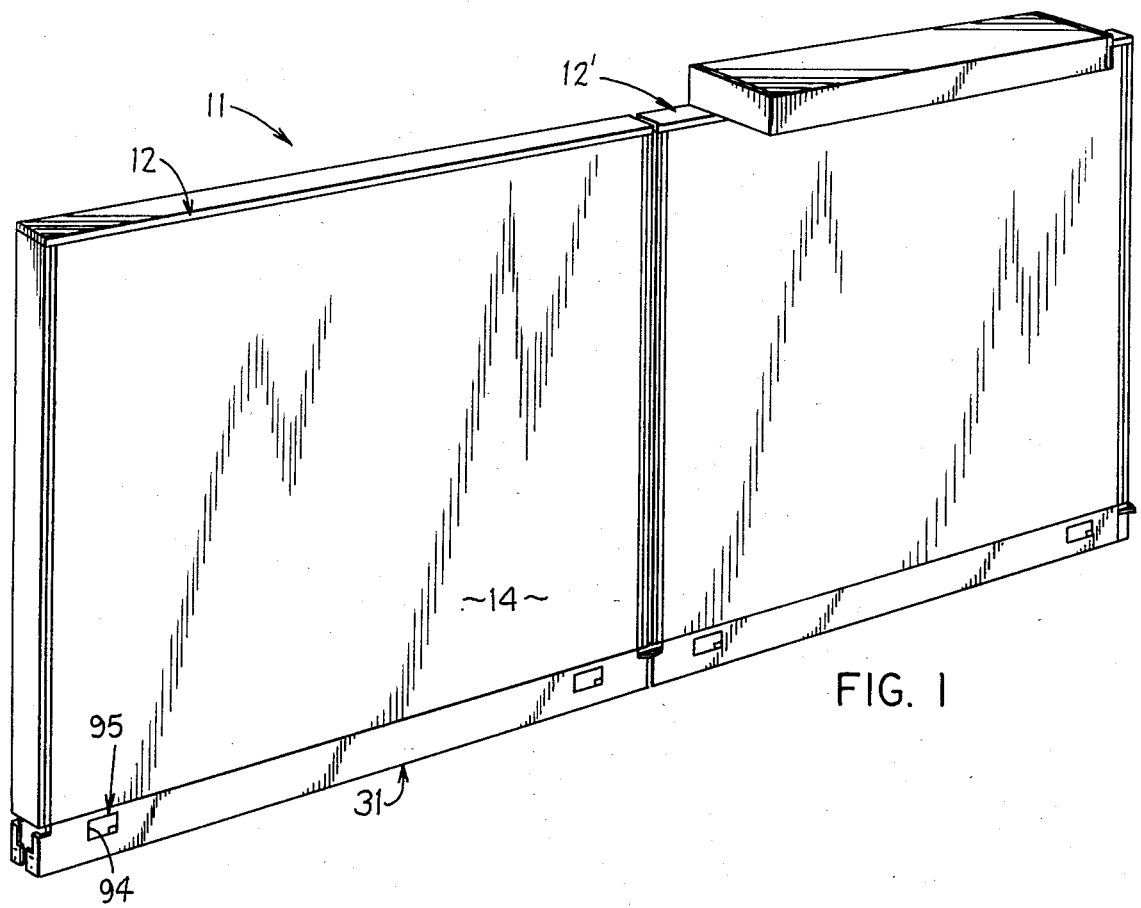
FIG. 1 is a perspective view illustrating a wall system incorporating therein the improved raceway structure of the present invention, only two panels being horizontally series-connected for purposes of illustration.
Figure 4:
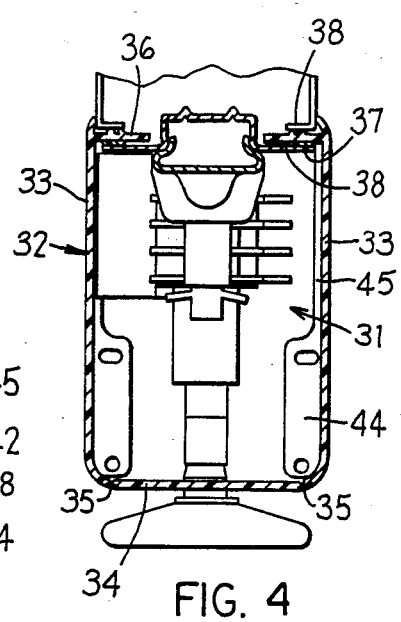
FIG. 4 is an enlarged sectional view taken substantially along line IV—IV in FIG. 2.
Figure 5:
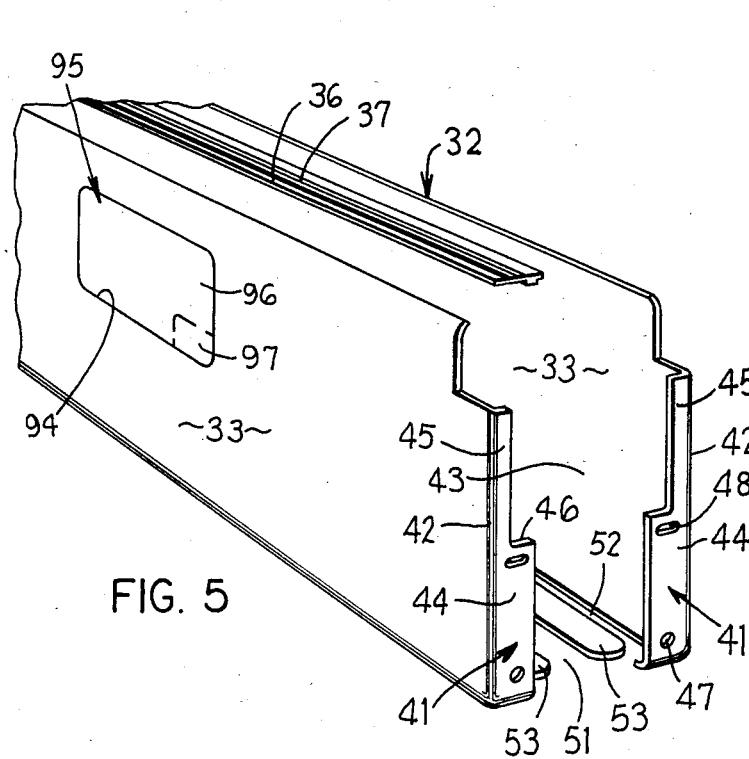
FIG. 5 is a fragmentary perspective view showing the end of the channel-shaped raceway member.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the panel or raceway structure and designated parts thereof. Said terminology will include the words specifically mentioned, derivatives thereof, and words of similar import.

DETAILED DESCRIPTION

FIG. 1 illustrates a wall panel system 11 formed by a series of interconnected upright prefabricated wall panels, only two substantially identical panels 12 and 12' being illustrated. Panels of different lengths can be serially interconnected, as by a conventional L-shaped plastic hinge.

Each panel, such as panel 12, includes an integral rigid rectangular frame formed by parallel top and bottom rails rigidly joined together by parallel side rails, the bottom rail 13 being partially illustrated in FIG. 3. These rails are channel-shaped and open inwardly of the panel, whereby the frame normally confines therein a suitable core structure, such as a honeycomb layer. The core and frame are normally sandwiched between thin facing sheets disposed on opposite sides of the frame, which sheets in turn are normally covered by layers of fiberglass and fabric, the latter defining the exterior side faces 14 of the panel. The structure of the panel and wall system as described above is well known, and one such structure is disclosed in U.S. Pat. No. 4,060,294.

Each panel may be provided with a prewired electrical system 16 extending longitudinally along the lower edge thereof, which system includes identical power blocks or terminals 17 and 18 disposed adjacent the opposite lower corners of the respective panel, as illustrated in FIGS. 2 and 3. Power blocks 16 and 17 are electrically joined together by a plurality of electrically conductive wires which extend therebetween and are disposed within the elongated closed channel 19 which is fixedly but releasably connected to the underside of the bottom frame rail 13.

To transmit electrical energy between adjacent connected panels to thereby define one or more electrical circuits extending longitudinally along the wall system, the opposed power blocks of adjacent panels are electrically but releasably joined together by a flexible electrical connector 21 which creates a plug-in electrical connection with each of the power blocks. For this purpose, each power block has a pair of plug-in connector portions 22 associated therewith and located on opposite sides thereof, whereby each power block can have two such connectors 21 joined thereto adjacent the opposite sides thereof. Each power block is also generally provided with at least one additional connector portion 23 associated with one or both sides thereof, and this latter connector portion 23 is adapted to create a plug-in electrical connection with a removable receptacle unit 24. This receptacle unit 24 has, on the exposed or outer side face thereof, a conventional three-hole socket for accommodating a conventional two-prong or three-prong electrical plug.

Each panel is further provided with a pair of support feet or glides 25 adjacent the opposite ends thereof, which glides have upwardly projecting threaded shafts 26 integrally associated therewith for adjustably but fixedly joining the glides to the interior frame structure of the panel in a conventional manner. These threaded shafts also extend through and mount thereon alignment members 27 which define an interfitting knucklelike arrangement between adjacent panels for maintaining adjacent panels in horizontal alignment with one another.

The wall system as briefly described above, including the individual panels and the electrical system associated therewith, is well known and is disclosed and described in greater detail in U.S. Patent Nos. 4,060,294 and 4,277,123.

To enclose the electrical system and any communication cables which are to be strung along the wall system, each wall panel is provided with a raceway structure associated therewith, and said U.S. Pat. No. 4,277,123 discloses therein one known raceway structure for this purpose. The present invention, however, relates to an improved raceway structure 31 for enclosing the electrical system and communication cables as they extend along the lower edge of the respective panels.

The raceway structure 31 of this invention includes a one-piece elongated channel member 32 which is formed of a plastics material and extends horizontally along the lower edge of the respective panel. This channel member 32 includes a pair of substantially identical and elongated sidewalls or covers 33 which are joined together by a bottom wall 34 so as to effectively define an upwardly opening channel. Each side cover 33 is, adjacent its juncture with the bottom wall 34, hingedly connected to the bottom wall 34 by an integral plastic hinge 35 which extends longitudinally along the channel member. This hinge enables each of the side covers 33 to be individually swung outwardly and downwardly into an open position so as to provide access to the interior of the channel member. Each side cover 33 also has a locking flange 36 which projects inwardly therefrom in the vicinity of the upper edge thereof. This flange 36 extends longitudinally throughout substantially the complete length of the side cover and is provided with suitable resilient tabs or projections 37 projecting upwardly and downwardly therefrom. This locking flange is adapted to be inserted into a groove defined between a pair of spaced and substantially parallel mounting flanges 38 fixedly associated with the lower rail of the panel frame. The resilient protrusions 37 releasably but securely hold the flange 36 within this slot so as to securely mount the channel member on the lower edge of the panel.

The channel member 32 has a length which substantially corresponds to the length of the panel. Each end of the channel member 32, however, is provided with a pair of end flanges 41 which define a plane substantially perpendicular to the longitudinal direction of the channel member. These end flanges 41 are integrally joined to the respective side cover 33 through a rounded substantially 90° corner 42, whereby the flanges 41 project inwardly toward one another but are suitably spaced apart by a slot or space 43 which extends throughout the complete height of the channel member.

Each end flange 41 is of a stepped configuration in that it includes a lower part 44 which is of slightly greater width than the upper part 45, with a step or shoulder 46 being defined therebetween. Each part 44 and 45 extends over approximately one-half the height of the end flange. Each lower part 44 has a substantially circular hole or opening 47 extending therethrough adjacent the lower end thereof, and a further hole 48 also extends through the lower part 44 in the vicinity of the step or shoulder 46. This hole 48 is preferably horizontally elongated within the plane of the end flange so as to define an elongated slot.

The bottom wall 34, adjacent each end of the channel member, is provided with an elongated slot 51 which opens inwardly from the free end of the bottom wall substantially along the central axis thereof through a limited extent. This slot 51 is of suitable width so as to accommodate therein the threaded shaft 26 associated with the glide 25. A further pair of slots 52 also extend inwardly from the end of the bottom wall through a limited extent, which slots are disposed directly adjacent the lower edges of the respective side covers 33. These slots 51 and 52 define therebetween a pair of cantilevered finger portions 53 adjacent each end of the bottom wall, which finger portions can be resiliently deflected upwardly when desired so as to enable the glides 25 to be threadably adjusted into an uppermost position wherein they deflect the finger portions upwardly, and permit the panel to be disposed so that the channel member 32 rests substantially on the support surface or floor.

Figure 8:
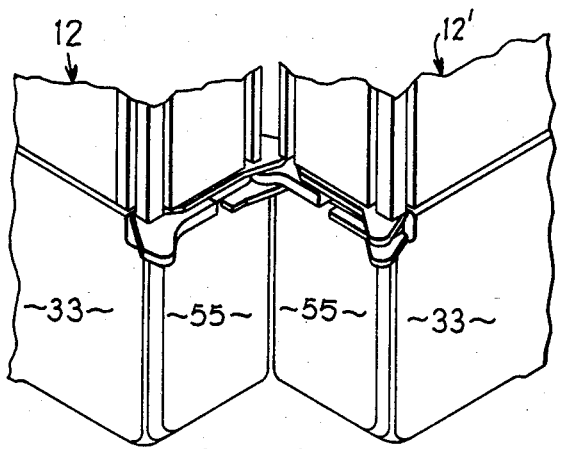
FIG. 8 illustrates two panels joined together in perpendicular relationship and having end covers on the raceway members.

To close off the end of the channel member 32 at an exposed end of a wall system as illustrated in FIG. 1, or when the wall panels are joined at an angle as illustrated by FIG. 8, there is provided a one-piece plastic end cover 55 which is adapted to snappingly but releasably engage the end flanges 41. This end cover 55 as appearing in FIGS. 6 and 7 includes a main planar part 56 which is of a substantially rectangular configuration and overlies the end flanges 41 to close off the end of the channel member 32. This planar part 56 has a pair of substantially L-shaped hooks 57 which project inwardly and downwardly from adjacent the opposite lower corners thereof, which hooks are adapted to project into and through the circular holes 47 formed adjacent the lower ends of the end flanges 41. The planar part 56 also has a pair of pins 58 projecting inwardly from the inner surface thereof. These pins 58 are disposed adjacent the opposite sides of the planar part substantially midway between the upper and lower edges thereof. Pins 58 are of a tapered configuration so that they converge in horizontal cross section to hence project through and create a snug engagement within the elongated slots 48 formed in the end flanges 41. These hooks 57 and pins 58 create a snug holding engagement between the opposite side covers 33 adjacent the end of the channel 32 so as to provide a more rigidified structure.

Figure 7:
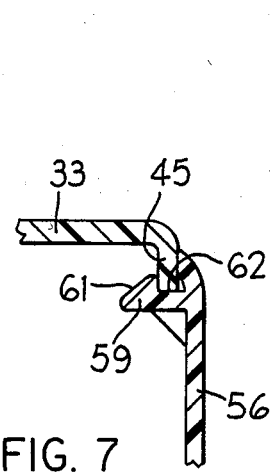
FIG. 7 is an enlarged fragmentary sectional view along line VII—VII in FIG. 6.

End cover 55 also has a pair of latching bars 59 which project inwardly from the inner surface adjacent the opposite sides thereof. These latching bars 59 are cantilevered inwardly but each is vertically elongated so that the bars extend substantially parallel to one another, and extend over substantially the upper half of the end cover. Each of these latching bars 59, when viewed in cross section as illustrated by FIG. 7, has a tapered camming surface 61 provided on the outer side thereof, which surface terminates in a locking slot 62 directly adjacent the inner side of the main planar part 56. These latching bars 59 are adapted to slidably move inwardly past the vertical edges of the upper end flange parts 45 by slidably moving along the camming surfaces 61 causing slight resilient deflection of the latching bars, following which the latching bars resiliently snap into position behind the upper flange parts 45 so that the free edges thereof are held within the slots 62.

A further pair of bars 63, in this case supporting bars, are provided on the end cover 55. These bars 63 also project inwardly from the inner surface of the end cover, and project vertically downwardly in parallel relationship adjacent the opposite sides of the end cover. These support bars 63 are spaced apart by a sufficient distance so as to be snugly engaged with and positioned between the inner edges of the lower end flange parts 44 when the end cover is mounted on the channel.

Figure 6:
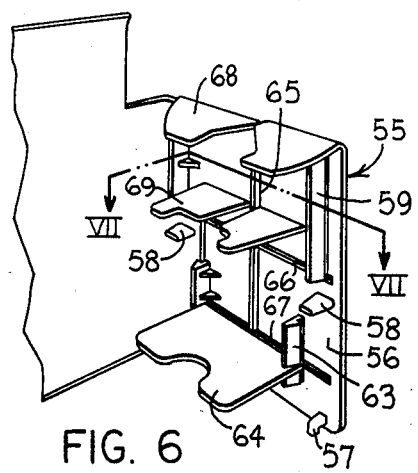
FIG. 6 is a fragmentary perspective view showing the attachment of an end cover to the channel-shaped raceway member.

As illustrated by FIG. 6, end cover 55 has a bottom support flange or plate 64 which projects horizontally inwardly from the inner surface of the main planar part 56 in substantially perpendicular relationship thereto. This bottom support plate 64 is disposed closely adjacent but spaced slightly upwardly from the lower edge of the main part 56. The inner surface of the main part is also provided with several grooves or score lines therein which reduce the thickness of the main part, including a vertical groove 65 which extends vertically along the central plane of the main part 56 from the upper edge thereof to a location disposed directly above the reinforcing plate 64, a top horizontal groove 66 which extends horizontally across the main part substantially between and directly below the lower ends of the latching bars 59, and a lower horizontal groove 67 which is disposed directly above the lower reinforcing plate 64 and intersects the lower end of the vertical groove 65. The horizontal grooves 66 and 67 are both of substantially the same length and terminate short of the free side edges of the main plate 56.

Additional support flanges and covers are also provided on the end cover 55. For example, a pair of substantially identical top cover parts 68 project inwardly from the upper free edge of the main part 56. These top cover parts 68 are substantially horizontal planar portions which project inwardly but are separated from one another by the upper end of the vertical groove 65. These adjacent parts 68 are also slightly vertically spaced so that they can horizontally overlap. A pair of middle support plates 69 also project horizontally inwardly from the main part substantially above the upper horizontal groove 66, these middle support plates 69 being coplanar but separated from one another by the vertical groove 65. These plates 64, 68 and 69 all cooperate with the slide shaft or alignment member so as to provide also support for the end cover.

Figure 9:
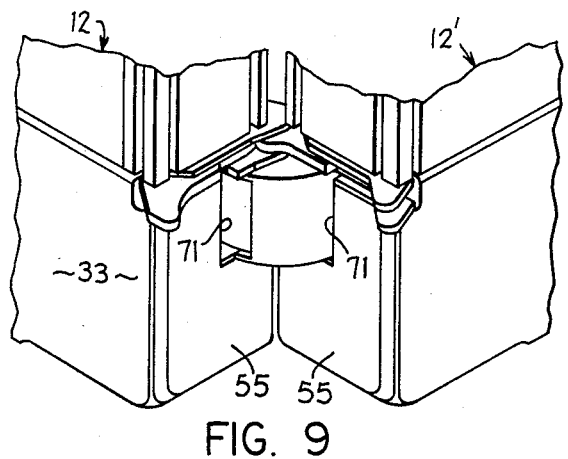
FIGS. 9 and 10 iillustrate variations of FIG. 8.

The end covers 55 can be positioned on the ends of the channels 32 so as to close the latter and hence define a totally closed structure at the end of the wall system, or at an angled intersection in the wall system, substantially as illustrated by FIG. 8. In many instances, however, particularly when the wall system is electrified, the flexible electrical connector 21 extends between the channel members 32 of adjacent connected panels. Hence, as illustrated in FIG. 9, provision must be made for this flexible electrical connector 21. In this instance, parts of the adjacent end covers 55 are removed to provide suitable openings 71 in the end covers to facilitate passage therethrough of the flexible connector 21. The opening 71 is created by physically cutting a window in the respective end cover. For example, approximately the upper one-fourth of each end cover is removed by creating a cut downwardly along the vertical groove 65 and thence horizontally along the top groove 66 through one side edge so as to remove either the upper right or upper left quarter of the end cover. Even with this quarter of the end cover removed, however, sufficient structure remains in the remaining lower quarter to securely join the end cover to its respective channel 32.

Figure 10:
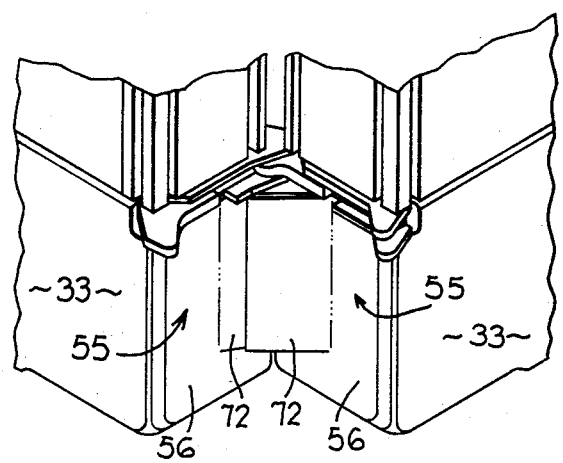

In other instances, it may be desired to solely run communication cables between the channels 32 of adjacent panels, and in which case the end covers 55 are modified as illustrated by FIG. 10. In this instance, the adjacent end covers are each cut so as to create a resiliently swingable flap 72. This flap 72 is created by creating a cut which projects inwardly from one side edge of the end cover along the bottom horizontal groove 67, which cut terminates at the vertical groove 65. This vertical groove 65 hence functions as a hinge axis to enable the cut portion, namely the flap 72, to be resiliently deflected outwardly. This single cut is formed on the adjacent end caps so as to create two flaps. These flaps can be resiliently deflected outwardly so as to overlap one another as illustrated in FIG. 10, whereupon communication cables can then pass between the adjacent panels through the openings created in the end covers, with the cables themselves being hidden by the flaps 72. The flap 72 itself carries with it one of the top cover parts 68 so that the latter effectively closes off the upper end of the triangular region defined behind the flaps so as to wholly enclose the communication cables.

In addition to the variations illustrated by FIGS. 9 and 10, in many instances it is desired to pass both the flexible connector of FIG. 9 and the communication cables of FIG. 10 through a right-angle corner substantially as illustrated by these figures. In such instance, the end covers are again cut so as to create the windows or openings 71 therein, and cuts are also formed along the bottom horizontal groove 67 so as to create the flap 72, only in this instance the flap 72 will extend only through the vertical extent defined between the horizontal grooves 66 and 67. The flexible electrical connector will extend through the openings 71 and be disposed uppermost, whereas the flaps 72 will be disposed below the flexible electrical connector and permit the communication cables to pass between the channels of adjacent panels.

Referring now to FIGS. 11 and 12, there is illustrated a different type of installation wherein the panels 12 and 12' are joined together in angled relationship, and the panel 12' in turn is joined to a third panel 12" which is substantially aligned with the first panel 12. This joining of three panels, commonly referred to as a T-connection, results in an open region at the intersection between the three panels. To improve the esthetics of the arrangement, it is conventional to provide what is referred to as a straight finishing post for bridging the gap between the side surfaces of the panels 12 and 12" so as to create a substantially flush and continuous surface. This in turn requires that there also be provided a straight finishing post cover 81 for joining the side covers 33 of the channels associated with the panels 12 and 12".

This straight finish post cover 81 is of extremely similar construction to the end cover 55 in that it is also of a one-piece construction and is formed of a plastics material. It includes a main substantially planar part 82 of substantially rectangular configuration. A pair of securing pins 83 are formed on the inner surface of the main part 82 adjacent the lower corners thereof, which pins 83 project sidewardly in opposite directions so as to be insertable through the holes 47 provided in the end flanges 41 of the adjacent channels 32. A further pair of pins 84 also project inwardly and sidewardly from the main part 82 substantially vertically centrally thereof, and these pins 84 project through the slots 48 formed in the end flanges 41.

The straight finish cover 81 also has an upper pair of latching bars 85 which project sidewardly beyond the opposite side edges thereof for latching engagement with the edges of the upper end flange parts 45, and a pair of lower latching bars 86 which also project sidewardly for latching engagement with the lower end flange parts 44. These latchings bars 85 and 86 both have a configuration such that, as they project sidewardly from the cover 81, they have a camming surface followed by a locking groove or slot so as to create the same type of locking relationship as illustrated by FIG. 7.

To maintain proper alignment between the cover 81 and the finishing post 87 which is disposed thereabove, the latter normally is provided with a platelike tab 88 depending downwardly therefrom so as to overlap the rear surface of the cover 81. This cover 81 has a pair of rearwardly projecting pinlike projections 89 which create a snap-type engagement within openings formed in the tab 88.

FIG. 13 illustrates a variation of the straight finish post cover. More specifically, FIG. 13 illustrates a curved finish post cover 91 which is used in those situations where two panels define a 90° corner, with the corner having a finish post mounted between the panels to improve the esthetics thereof. In this instance, the curved finish post cover 91 is provided for joining the exterior side covers 33 associated with the channels 32 of the two panels. This curved finish post cover 91 is identical to the straight finish post cover 81, and releasably engages the side covers 33 of the adjacent channels 32, using the same types of structural connections. The curved finish post cover 91 deviates from the straight finish post cover 81 solely by providing the main part 92 with a 90° smoothly curved corner intermediate the length thereof.

Figure 14:
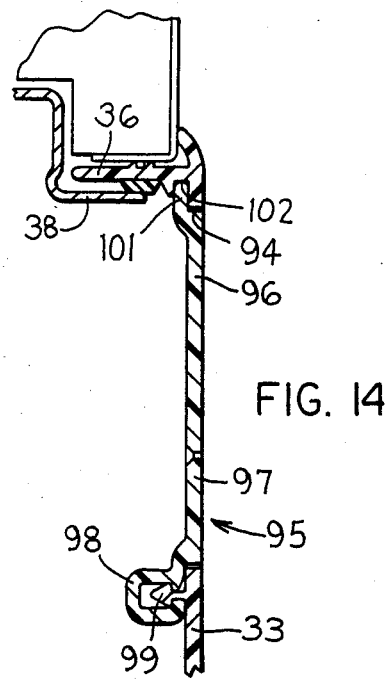
FIG. 14 is an enlarged fragmentary sectional view taken substantially along line XIV—XIV in FIG. 3.

Referring now to the channel 32, and specifically FIGS. 1 and 14, each side cover 33 is provided with a pair of substantially identical openings or windows 94 formed therethrough adjacent the opposite ends thereof. These windows are disposed substantially in alignment with the connector portion 23 provided on the respective power block so as to accommodate therein the receptacle unit 24. However, since receptacle units 24 are provided only at selected locations, each window 94 has a cover structure 95 associated therewith for permitting closing of the window when the receptacle unit 24 is not utilized.

This cover structure 95 includes a main substantially rectangular cover 96 which substantially totally occupies the window except for a small corner thereof, which small corner is closed by means of a secondary cover 97, the latter being provided so as to permit a small cable to extend through the window even when the receptacle unit is not utilized. These main and secondary covers 96 and 97, respectively, when in a closed position, are substantially flush with the side cover 33.

Each of these covers 96 and 97 is connected to the side cover by means of an identical structure which includes a mounting channel 98 which is fixedly, here integrally, connected to the lower edge of each cover 96 and 97. This mounting channel 98 opens forwardly through a mouth of reduced cross section, which mouth extends longitudinally of the mounting channel. The mounting channel 98 accommodates therein a headed rib or rail 99 which is fixed to and projects inwardly from the side cover 33. This rib 99 is disposed directly below the window 94 and extends longitudinally along the side cover through a substantial extent which exceeds the length of the window. The connecting structure between the covers 96 and 97 and the side cover 33, which connecting structure involves the mounting channel 98 and rib 99, enables the covers 96 and 97 to be maintained within the window 94 in a closed position, but also enables the covers to be displaced slightly rearwardly out of the window, following which the covers can be slidably displaced longitudinally along the rail 99 and hence stored in sidewardly spaced relationship behind the side cover 33 when the window is to be uncovered.

To permit proper securement of the cover structure 95 in the closed position, each cover 96 and 97 has appropriate tabs 103 thereon which overlap the rear wall of the side cover 33 when the covers are closed to prevent the covers from moving outwardly past the outer flush surface of the side cover. In addition, the upper edge of the main cover 96 is provided with a rearwardly and upwardly projecting offset which defines a locking tab 101, the latter being engaged within a locking groove 102 as formed along the underside of the flange 36 to securely maintain the main cover in its closed position. When opening of the main cover 96 is desired, however, then an inwardly directed pushing force against the main cover causes the locking tab to sufficiently resiliently deflect as to move rearwardly out of the locking groove so as to permit the cover to be displaced rearwardly of the window, whereupon the main cover can then be slidably moved longitudinally along the rail into a storage position which is sidewardly displaced from the window. When in this latter position, however, the locking tab 102 is still effectively positioned directly adjacent the free end of the lowermost flange 38 so that the main cover is still maintained substantially in an upright position even when in its open position. This arrangement greatly facilitates the opening and closing of the cover and the movement thereof between the window-opening and window-closing positions. Further, when in its open position, the cover does not interfere with the interior use of the channel structure, and can be compactly stored directly behind the side cover 33. Even after the cover has been moved into an open position, it can again be easily restored and moved into its closing position if use of a receptacle is not desired without damaging the cover structure or destroying the resulting appearance of the raceway structure.

The structure and operation of the raceway structure has been described above, including the assembly thereof, with the disassembly being substantially opposite to the assembly, so that further description thereof is believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an upright space-dividing wall structure formed from a plurality of prefabricated upright panels which are serially connected together, and a raceway structure associated with the lower edge of each said panel and extending longitudinally thereof, said raceway structure defining therein an interior channel extending longitudinally of the panel, the improvement wherein said raceway structure comprises a horizontally elongated one-piece channel member which opens upwardly and includes a bottom wall and a pair of upwardly projecting side covers which adjacent their upper edges are provided with means for releasably securing said channel member to said panel adjacent the lower edge thereof, each said side cover being joined to said bottom wall by an integral hinge to permit the side cover to be swingably moved between an upright closed position and a lowered open position providing access into the interior of said channel member, said channel member at each end thereof having a pair of end flanges which project transversely inwardly from a respective one of said side covers in opposed relationship to one another, said end flanges defining a substantially vertical plane which extends substantially perpendicular with respect to the longitudinal direction of said channel member, said end flanges each projecting transversely inwardly through an extent which is less than one-half the horizontal width of said channel so that the end flanges have opposed free edges which extend substantially vertically and are horizontally separated by a slotlike space which is defined therebetween and communicates with the end of said channel, first and second vertically spaced opening means formed in each of said end flanges, and a one-piece end cover releasably attached to said pair of end flanges for closing off the end of said channel member, said one-piece end cover including a substantially planar part of substantially rectangular shape corresponding to the cross section of said channel member, a pair of horizontally spaced first pin means fixed to and projecting outwardly from the inner side of said planar part for respective engagement with the first opening means, a pair of horizontally spaced second pin means projecting outwardly from the inner side of said planar part, the second pin means being positioned vertically above the first pin means and respectively engaged with the second opening means, said first and second pin means when engaged within the first and second opening means maintaining the side covers in their upright closed positions for preventing either inward or outward movement of the side covers.

2. A wall structure according to claim 1, wherein said end cover includes a pair of latching elements fixed to and projecting from the inner side of said planar part for creating a releasable latching engagement with said end flanges in the vicinity of the free vertical edges thereof, said latching elements being horizontally spaced apart by a distance which approximately corresponds to the horizontal spacing between the vertical free edges of the opposed end flanges, said latching elements being hook-shaped so as to resiliently engage the rear side of the respective end flange adjacent the vertical free edge thereof, each said latching element being of substantial vertical extent so as to supportingly engage the vertical free edge of the respective end flange over a substantial vertical extent so as to provide substantial support to withstand external horizontally-directed impact forces as imposed on said side covers.

3. A wall structure according to claim 2, including undercut groove means formed in said planar part on the inner side thereof for permitting selective severing of said planar part to form a windowlike opening therethrough for communication with said channel, said groove means including a first groove which extends vertically downwardly from the upper edge of said planar part through a substantial extent of the height thereof, said first groove being disposed substantially centrally between the vertical side edges of the planar part, and said groove means also including a horizontal groove which is spaced downwardly from the upper edge of said planar part and extends across a majority of the width thereof.

4. A wall structure according to claim 2, wherein said end cover includes a plurality of substantially horizontal platelike stiffening members integrally fixed to and projecting inwardly from said planar part, said stiffening members being vertically spaced apart.

5. A wall structure according to claim 1, wherein each said side cover has a substantially rectangular windowlike opening formed therethrough, and movable closure means cooperating with said side cover for closing said windowlike opening, said closure means including a substantially rectangular platelike member sized so as to snugly fit within said windowlike opening in substantially flush relationship with said side cover for closing said windowlike opening, and connecting means for joining said platelike member to said side cover to enable the platelike member to be moved from the closed position inwardly of said channel into an open position wherein the platelike member is stored within the interior of said channel, said connecting means being defined by a separable snap-type connection for joining said platelike member to said side cover.

6. A wall structure according to claim 5, wherein said connecting means includes a first part formed substantially as an elongated rail and a second part formed substantially as an elongated channel-like element, the rail having an enlargement adjacent the free end thereof, said channel-like element being telescoped over said rail so as to create a connection therebetween which enables said platelike member to be moved between open and closed positions relative to said side cover, one of said parts being fixedly secured to and projecting inwardly from the inner surface of said side cover, and the other of said parts being fixedly secured to said platelike member.

7. A wall structure according to claim 6, wherein said one part is fixed to said side cover adjacent one of the edges of said windowlike opening and extends horizontally therealong through an extent which substantially exceeds the horizontal width of said windowlike opening, said platelike member when in an open position being disposed just inwardly of said side cover so as to be substantially vertically oriented so that the platelike member can be horizontally slidably displaced along said other part into a position wherein the platelike member is spaced laterally from said windowlike opening.

8. In an upright space-dividing wall structure formed from a plurality of prefabricated upright panels which are serially connected together, and a raceway structure associated with the lower edge of each said panel and extending longitudinally thereof, said raceway structure defining therein an interior channel extending longitudinally of the panel, the improvement wherein said raceway structure comprises a horizontally elongated one-piece channel member which opens upwardly and includes a bottom wall and a pair of upwardly projecting side covers.which adjacent their upper edges are provided with means for releasably securing said channel member to said panel adjacent the lower edge thereof, each said side cover being joined to said bottom wall by an integral hinge to permit the side cover to be swingably moved between an upright closed position and a lowered open position providing access into the interior of said channel, said channel member at each end thereof having a pair of end flanges which project transversely inwardly from a respective one of said side covers in opposed relationship to one another, said end flanges defining a substantially vertical plane which extends substantially perpendicular with respect to the longitudinal direction of said channel member, said end flanges each projecting transversely inwardly through an extent which is less than one-half the horizontal width of said channel so that the end flanges have opposed free edges which extend substantially vertically and are horizontally separated by a slotlike space which is defined therebetween and communicates with the end of said channel, opening means formed in each of said end flanges, and a one-piece end cover releasably attached to said pair of end flanges for closing off the end of said channel, said one-piece end cover including a substantially planar part of substantially rectangular shape corresponding to the cross section of said channel member, a pair of horizontally spaced pin means fixed to and projecting outwardly from the inner side of said planar part for respective engagement with said opening means for maintaining the side covers in their upright closed positions for preventing either inward or outward movement of the side covers, said end cover also including a pair of latching elements fixed to and projecting from the inner side of said planar part for creating a releasable latching engagement with said end flanges in the vicinity of the free vertical edges thereof, said latching elements being horizontally spaced apart by a distance which approximately corresponds to the horizontal spacing between the vertical free edges of the opposed end flanges, said latching elements being hook-shaped so as to resiliently engage the rear side of the respective end flange adjacent the vertical free edge thereof, each said latching element being of substantial vertical extent so as to supportingly engage the vertical free edge of the respective end flange over a substantial vertical extent so as to provide substantial support to withstand external horizontally-directed impact forces as imposed on said side covers.

9. In an upright space-dividing wall structure having at least three prefabricated upright panels serially connected together to form a T-shaped configuration, first and second of said panels having adjacent edges joined together, and the second panel having the edge thereof joined to an edge of the third panel, the first and third panels being disposed substantially in alignment with one another but having their opposed edges spaced apart by a distance which approximately equals the width of said second panel, and a raceway structure associated with the lower edge of each said panel and extending longitudinally therealong, said raceway structure defining therein an interior channel extending longitudinally of the respective panel, the improvement wherein the said raceway structure comprises a horizontally elongated one-piece channel member which opens upwardly and includes a bottom wall and a pair of upwardly projecting side covers which adjacent their upper edges are provided with means for releasably securing said channel member to said panel adjacent the lower edge thereof, each said side cover being joined to the respective bottom wall by a hinge to permit the side cover to be swingably moved between an upright closed position and a lowered open position providing access into the interior of said channel member, said channel member at each end thereof having a pair of end flanges which project transversely inwardly from a respective one of said side covers in opposed relationship to one another, said end flanges defining a substantially vertical plane which extends substantially perpendicular with respect to the longitudinal direction of said channel member, said end flanges projecting transversely inwardly through an extent which is less than one-half the horizontal width of said channel so that the end flanges have opposed free edges which extend substantially vertically and are horizontally separated by a slotlike space which is defined therebetween and communicates with the end of said channel, and a one-piece finishing cover releasably attached to one of the end flanges associated with the channel member of said first and third panels for permitting said finishing cover to span the space between said first and second panels and be positioned substantially flush with the side covers of the channel members which are on the side of the first and second panels which is remote from said second panel, said end cover including a pair of pins which are fixed to and project outwardly from opposite sides of said finishing cover and project through holes formed in the end flanges of the channel members, said finishing cover also having a pair of sidewardly projecting latching elements which project outwardly from opposite sides of the finishing cover and create a releasable latching engagement with the end flanges on the channels of the first and third panels.

10. A wall structure according to claim 9, wherein each end flange has a pair of vertically spaced holes projecting therethrough, said finishing cover having first and second pairs of said pins projecting outwardly from opposite sides thereof, the pins of the first pair projecting sidewardly for engagement with the uppermost holes formed in the end flanges, the pins of the second pair projecting sidewardly in opposite directions for engagement with the lowermost holes in the end flanges, said pins and said latching elements engaging solely the end flange associated with the channel member of the first and third panels which is on that side of the respective panel which is remote from said second panel.

* * * * *